(12) United States Patent
Wang et al.

(10) Patent No.: US 10,353,271 B2
(45) Date of Patent: Jul. 16, 2019

(54) DEPTH ESTIMATION METHOD FOR MONOCULAR IMAGE BASED ON MULTI-SCALE CNN AND CONTINUOUS CRF

(71) Applicant: ZHEJIANG GONGSHANG UNIVERSITY, Hangzhou, Zhejiang (CN)

(72) Inventors: Xun Wang, Zhejiang (CN); Leqing Zhu, Zhejiang (CN); Huiyan Wang, Zhejiang (CN)

(73) Assignee: ZHEJIANG GONGSHANG UNIVERSITY, Hangzhou, Zhejiang (CN)

( * ) Notice: Subject to any disclaimer, the term of this patent is extended or adjusted under 35 U.S.C. 154(b) by 0 days.

(21) Appl. No.: 15/751,872

(22) PCT Filed: Dec. 14, 2016

(86) PCT No.: PCT/CN2016/109980
§ 371 (c)(1),
(2) Date: Feb. 11, 2018

(87) PCT Pub. No.: WO2018/000752
PCT Pub. Date: Jan. 4, 2018

(65) Prior Publication Data
US 2018/0231871 A1    Aug. 16, 2018

(30) Foreign Application Priority Data

Jun. 27, 2016   (CN) .......................... 2016 1 0510552

(51) Int. Cl.
*G03B 13/30* (2006.01)
*G03B 3/02* (2006.01)
(Continued)

(52) U.S. Cl.
CPC ......... *G03B 13/30* (2013.01); *G02B 27/0075* (2013.01); *G03B 3/02* (2013.01);
(Continued)

(58) Field of Classification Search
None
See application file for complete search history.

(56) References Cited

U.S. PATENT DOCUMENTS

2007/0297784 A1   12/2007  Wong
2016/0379352 A1*  12/2016  Zhang .................. G06T 7/0002
                                                         382/157

(Continued)

FOREIGN PATENT DOCUMENTS

CN       102034248         4/2011
CN       102708569        10/2012

(Continued)

*Primary Examiner* — William B Perkey

(57) ABSTRACT

A depth estimation method for a monocular image based on a multi-scale CNN and a continuous CRF is disclosed in this invention. A CRF module is adopted to calculate a unary potential energy according to the output depth map of a DCNN, and the pairwise sparse potential energy according to input RGB images. MAP (maximum a posteriori estimation) algorithm is used to infer the optimized depth map at last. The present invention integrates optimization theories of the multi-scale CNN with that of the continuous CRF. High accuracy and a clear contour are both achieved in the estimated depth map; the depth estimated by the present invention has a high resolution and detailed contour information can be kept for all objects in the scene, which provides better visual effects.

6 Claims, 2 Drawing Sheets

(51) Int. Cl.
    *G02B 27/00*     (2006.01)
    *G06K 9/62*     (2006.01)
    *G06K 9/00*     (2006.01)
    *G06N 3/08*     (2006.01)
    *G06T 7/579*     (2017.01)
    *H04N 13/271*     (2018.01)
    *G06T 7/50*     (2017.01)

(52) U.S. Cl.
    CPC ..... *G06K 9/00208* (2013.01); *G06K 9/00228* (2013.01); *G06K 9/62* (2013.01); *G06N 3/08* (2013.01); *G06T 7/50* (2017.01); *G06T 7/579* (2017.01); *H04N 13/271* (2018.05)

(56) References Cited

U.S. PATENT DOCUMENTS

| | | | | |
|---|---|---|---|---|
| 2017/0061246 A1* | 3/2017 | Chen | ..................... | G06K 9/6232 |
| 2017/0061258 A1* | 3/2017 | Chen | ..................... | G06N 3/08 |
| 2017/0195654 A1* | 7/2017 | Powers | ..................... | H04N 13/0253 |
| 2017/0294027 A1* | 10/2017 | Babenko | ..................... | G06T 7/62 |
| 2017/0371329 A1* | 12/2017 | Giering | ..................... | G05B 23/0254 |
| 2018/0077400 A1* | 3/2018 | Ayari | ..................... | H04N 13/0011 |
| 2018/0082106 A1* | 3/2018 | Inaba | ..................... | G06K 9/00214 |
| 2018/0130229 A1* | 5/2018 | Zia | ..................... | G06T 7/74 |
| 2018/0144491 A1* | 5/2018 | Konieczny | ..................... | G06T 7/55 |
| 2018/0150681 A1* | 5/2018 | Wang | ..................... | G06K 9/00228 |
| 2018/0231871 A1* | 8/2018 | Wang | ..................... | G06T 7/50 |

FOREIGN PATENT DOCUMENTS

| | | |
|---|---|---|
| CN | 104361328 | 2/2015 |
| CN | 105095862 | 11/2015 |
| CN | 105160361 | 12/2015 |
| CN | 106157307 | 11/2016 |

* cited by examiner

DEPTH ESTIMATION METHOD FOR MONOCULAR IMAGE BASED ON MULTI-SCALE CNN AND CONTINUOUS CRF

CROSS REFERENCE OF RELATED APPLICATION

This is a U.S. National Stage under 35 U.S.C 371 of the International Application PCT/CN2016/109980, filed Dec. 14, 2016, which claims priority under 35 U.S.C. 119(a-d) to CN 201610510552.6, filed Jun. 27, 2016.

BACKGROUND OF THE PRESENT INVENTION

Field of Invention

The present invention relates to a technical field of 3D image depth estimation, and more particularly to a depth estimation method for a monocular image based on a multi-scale CNN and a continuous CRF

Description of Related Arts

In the video editing process, it is usually necessary to create a 3D model of the scene to ensure the temporal and spatial consistency of the edits, and the 3D model of the scene created from a two-dimensional video requires depth information of the scene. 3D movies and 3D TV can bring the audience the realism of the scene. Conventional 3D videos are synchronically shot and produced through multiple cameras from different angles, but this 3D video synchronization processing and production is expensive and time-consuming. In recent years, many researchers have sought to produce 3D video from a single video sequence through conventional 3D model libraries and depth estimation techniques, and have achieved some results. A significant step in converting 2D video into 3D video is to estimate a depth map from the 2D video sequence, so as to obtain the 3D model and project to a video sequence with another visual angle after obtaining the depth information, or calculate a view of another visual angle directly according to a binocular disparity principle.

Conventionally, depth information can be obtained through hardware and software. The hardware to obtain the depth information comprises laser range finder, 3D motion sensing device Kinect® by Microsoft, etc. However, the laser range finder is expensive, which is not conducive to the promotion. Although Kinect® is affordable, the maximum detection distance is no more than 5 meters, and light and background objects have great impact on sensing accuracy, so it is impossible to range objects which are transparent or reflective. The commonly adopted techniques include a multi-view stereo method, a photometric stereo method, a shape from shading method, a depth from defocus method, a machine learning method and so on. According to the multi-view geometric principle, if a number of images are shot from different viewpoints for a static scene, and there are common contents between different images, then it is possible to obtain camera internal and external parameters as well as the 3D scene information automatically from these images theoretically. If only two images are considered during the stereo, it is converted into a two-view stereo matching.

Photometric stereo technique is a 3D reconstruction algorithm based on illumination model, first proposed by Woodham of the University of British Columbia, Canada, which uses image sequences of object under different lighting conditions to estimate a surface normal graph of the object, and uses techniques such as line integral to obtain a final surface model. Photometric stereo method is also used to optimize initial 3D models obtained by other methods to obtain more accurate geometries. If the number of image sequences of the photometric stereo method is reduced to one, the technique is converted into chromaticity forming. Camera will focus on one object when shooting, so objects outside the focal plane will be more or less blurred, depending on depth. Estimating the depth according to blur degree is known as the defocus depth method. There are many improved methods based on the defocus depth method, such as dual focal plane method and coded aperture method. The reason why human beings can accurately perceive the depth information of a scene is largely dependent on accumulation of prior knowledge on object we have seen in daily life, in addition to depending on the binocular disparity of our visual system to perceive. The machine learning method is to imitate the learning processes of human, which is the most used method for depth estimation of monocular images. Saxena et al., Stanford University, USA, proposed the use of supervised learning algorithms to capture the 3D structure of the scene. Liu et al. improved the method of Saxena et al. by semantically segmenting a given image, and using these semantic segmentation results as constraints, and then using MRF (Markov random field) to infer the depth information, wherein the improved method has a significant performance improvement compared with the previous method.

In recent years, depth learning framework has been widely used in many fields such as automatic speech recognition, image recognition, natural language processing, drug discovery and toxicology, customer relationship management, bioinformatics and so on. As a high-performance machine learning framework, the depth learning method is also applied to the automatic depth estimation of monocular image. Eigen et al. firstly used a multi-scale convolution neural network (CNN) to achieve an end-to-end monocular image depth estimation. However, due to limited sizes of output results, the estimated depth map is much smaller than the originally inputted image, wherein height and width of the estimated depth map is only $\frac{1}{16}$ of those of the originally inputted image. Then, Eigen and Fergus had improved the network structure by firstly up-sampling the original CNN output and connecting to convolution results of the originally inputted image; and then using multiple convolution layers for processing, in such a manner that the neural network is deeper, and final output depth map has a higher resolution. Fayao Liu et al. also used deep convolution neural networks to estimate the depth information from monocular images. However, the CNN they designed was only used to estimate a single depth value that represents a depth value of a super-pixel in the image. The framework also integrates a continuous conditional random field (CRF) based on the super-pixel to further optimize the estimated depth, so as to make the output more reliable. The method based on the super-pixel is able to obtain a depth map whose size equals to the size of the originally inputted image and with a clearer contour. However, because the CNN derivation is based on local information, assessment data show that the accuracy of the method is less than the accuracy of the method by Eigen and Fergus.

SUMMARY OF THE PRESENT INVENTION

The invariance of deep convolution neural network (DCNN) makes DCNN very convenient to complete high-level tasks. However, output of DCNN is lacking localization and thus many details are lost. For overcoming the defects of DCNN, the present invention provides a depth estimation method for a monocular image based on multi-scale CNN and continuous CRF, comprising steps of:

(1) obtaining a preset amount of sample images, and processing the sample images with data enhancement and normalization in sequence;

(2) training a DCNN (deep convolution neural network) with normalized sample images by two stages, wherein the DCNN comprises a first stack, a second stack and a third stack; the first stack and the second stack are trained by a first stage, and the third stack is trained by a second stage; and (3) for an input image I whose depth is to be estimated, establishing a conditional probability distribution function P(Y|I) related to the input image I and a depth map Y thereof according to a DCNN output:

$$P(Y|I) = \frac{1}{Z(I)} \exp(-E(Y, I))$$

$$Z(I) = \int_Y \exp(-E(Y, I)) dY$$

$$E(Y, I) = \sum_i (z_i - y_i)^2 + \sum_{ij} (y_i - y_j)^2$$

$$\left[ w_{ij1} \exp\left(-\frac{\|p_i - p_j\|^2}{2\sigma_{ij1}^2} - \frac{\|c_i - c_j\|^2}{2\sigma_{ij2}^2}\right) + w_{ij2} \exp\left(-\frac{\|p_i - p_j\|^2}{2\sigma_{ij3}^2}\right) \right]$$

wherein Z(I) is a partition function corresponding to the input image I, E(Y,I) is an energy function related to the input image I and the depth map Y thereof, $z_i$ is a predicted logarithmic depth value of a No. i effective pixel, $y_i$ and $y_j$ are respectively true logarithmic depth values of the No. i effective pixel and a No. j effective pixel, $p_i$ and $p_j$ are coordinate values of the No. i effective pixel and the No. j effective pixel respectively, $c_i$ and $c_j$ are LAB color values of the No. i effective pixel and the No. j effective pixel respectively; $w_{ij1}$, $w_{ij2}$, $\sigma_{ij1}$, $\sigma_{ij2}$ and $\sigma_{ij3}$ are all CRF model parameters; i and j are both natural numbers and $1 \leq i \leq N$, $1 \leq j \leq N$, N is a total effective pixel number;

then finding a solution to maximize P(Y|I), and converting a calculated depth map $\hat{Y}$ from a logarithmic space into a linear space, so as to obtain a depth map with a high accuracy that reserves object contour information in detail.

The data enhancement comprises size scaling, rotating, translating, luminance shifting, and flipping; the normalization comprises subtracting a mean image from the sample images and dividing by a mean square error.

The first stack of the DCNN is an Imagenet pre-trained network, which adopts first seven layers of an Alexnet module or first fifteen layers of a VGG16 module; the second stack is formed by five convolution layers, first four of the five convolution layers all proceed with pooling operation, the last convolution layer has a linear output; wherein an input of a first convolution layer of the five convolution layers is the normalized sample images obtained in the step (1), and an input of a second convolution layer of the five convolution layers is a feature formed by concatenating an up-sampled output of the first stack to a pooled output of the first convolution layer of the five convolution layers; then an input of a next convolution layers is an output of a previous convolution layer; the third stack is formed by four convolution layers, first three of the four convolution layers proceed with pooling operation, the last convolution layer—has a linear output; wherein an input of a first convolution layer of the four convolution layers is the normalized sample images obtained in the step (1), and an input of a second convolution layer of the four convolution layers is a feature formed by concatenating an up-sampled output of the second stack to a pooled output of the first convolution layer of the four convolution layers; then an input of a next convolution layers is an output of a previous convolution layer.

A loss function L used in the first stage during training is:

$$L = \frac{1}{N}\sum_i d_i^2 - \frac{1}{2N^2}\left(\sum_i d_i\right)^2 + \frac{1}{N}\sum_i [(\nabla_x d_i)^2 + (\nabla_y d_i)^2]$$

wherein $d_i = \lg x_i - \lg x_i^*$, $x_i$ and $x_i^*$ are respectively a predicted depth value and an actual depth value of the No. i effective pixel, $\nabla_x d_i$ and $\nabla_y d_i$ are respectively a horizontal gradient and a vertical gradient $d_i$.

In the step (3), the solution to maximize P(Y|I) is achieved by:

$$\tilde{Y} = \underset{Y}{\mathrm{argmax}} P(Y|I) = A^{-1}Z$$

$$A = E + D - S$$

wherein Z is a depth map produced by up-sampling and boundary completion with bilinear interpolation to the output of the third stack of the DCNN, D is a diagonal matrix with diagonal elements $d_{ii} = \Sigma_j s_{ij}$, S is a similarity matrix whose element at the ith row and the jth column is $$s_{ij} = \sum_{ij} (y_i - y_j)^2$$

$$\left[ w_{ij1} \exp\left(-\frac{\|p_i - p_j\|^2}{2\sigma_{ij1}^2} - \frac{\|c_i - c_j\|^2}{2\sigma_{ij2}^2}\right) + w_{ij2} \exp\left(-\frac{\|p_i - p_j\|^2}{2\sigma_{ij3}^2}\right) \right],$$

E is an N×N unit matrix.

The parameters $w_{ij1}$, $w_{ij2}$, $\sigma_{ij1}$, $\sigma_{ij2}$ and $\sigma_{ij3}$ of CRF model are obtained by: integrating the CRF into the DCNN, and optimizing with an SGD method, wherein loss is calculated by comparing a CRF output with a ground truth logarithmic depth map; or independently optimizing a CRF module by using cross validation data set, wherein optimizated parameters are searched by cycling from large step sizes to small step sizes in a certain range, this time the DCNN parameters are constant.

The present invention combines optimization theories of the multi-scale CNN and the continuous CRF, so as not only to estimate the depth map with high accuracy, but also to keep a clear contour in the obtained depth map; the depth estimated by the present invention has a high resolution and reserves all contour details of all objects in the scene, and thus provides better visual effects.

DETAILED DESCRIPTION OF THE PREFERRED EMBODIMENT

Figure 1:
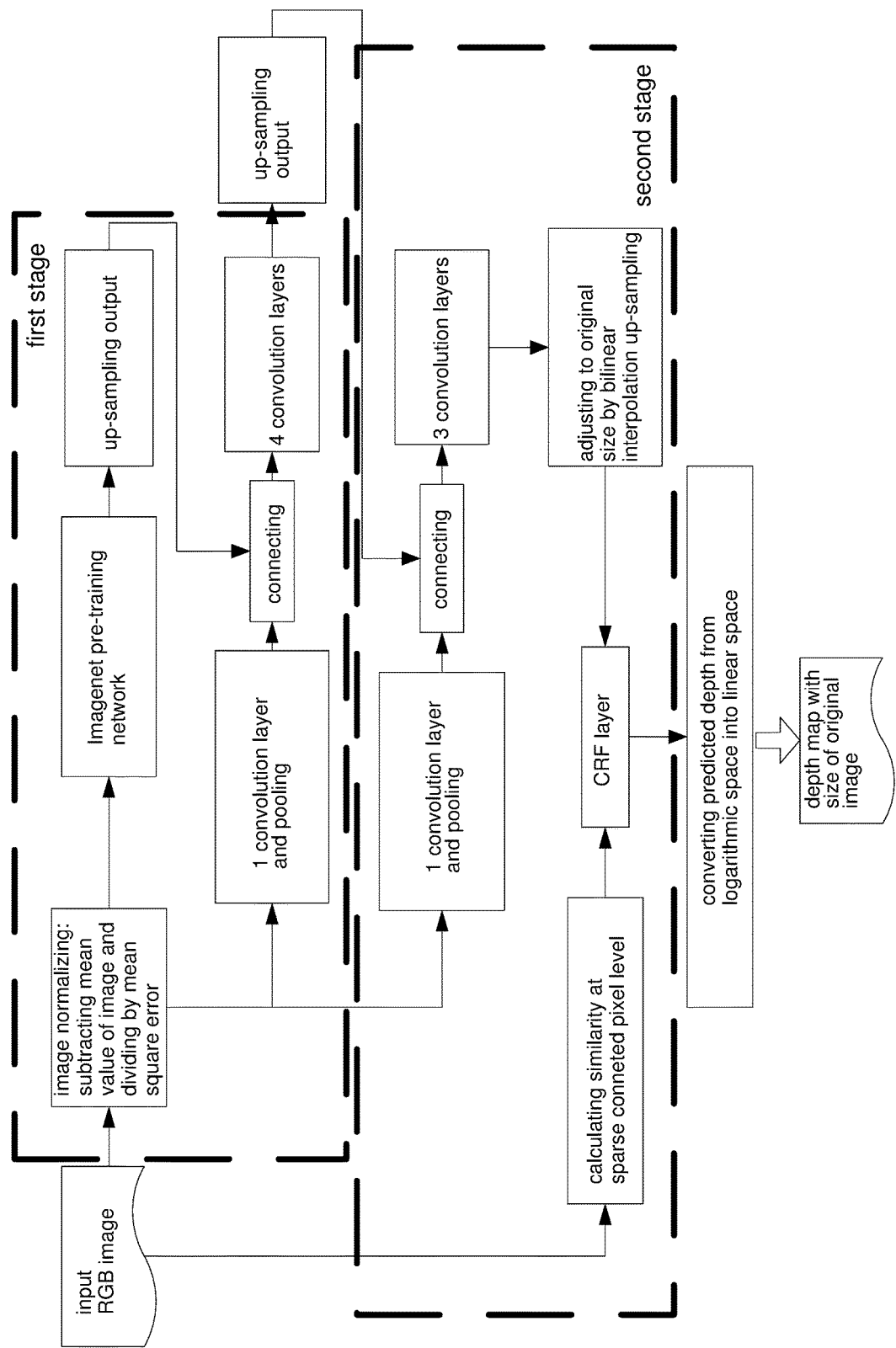
FIG. 1 is a flow chart of the depth estimation method of the present invention.

Referring to the drawings and embodiments, the present invention is further illustrated as follows.

A depth estimation method for a monocular image based on a CNN and a CRF of the present invention comprises steps of:

(1) preparing training data preparing a sufficient amount of training samples (self-captured or downloaded from public depth data collection via internet such as NYU Depth v2, KITTI, etc.), and processing the training samples with data enhancement such as scaling, rotating, translating, luminance shifting, and flipping, so as to bring strong generalization to a trained CNN; wherein during scaling enhancement, target depth data must be correspondingly adjusted; for example, if an original image is scaled by a factor of s, then the target depth should be multiplied by 1/s; adjusting input images of the training samples and normalizing, i.e. subtracting a mean image of the training images and dividing by a mean square error; wherein ground truth depth maps should also be adjusted to a smaller scale (target size at a first stage of training is ¼ of input length and width, and target size at a second stage of training is ½ of input length and width), and should be converted into a natural logarithmic space.

(2) training a DCNN since the whole network is very deep and the amount of parameters is very large, the training procedure of the DCNN is divided into two stages to avoid Gradient vanishing and over-fitting; wherein the first stage trains two stacks; the first stack is an Imagenet pre-trained network (which adopts first seven layers of an Alexnet module or first fifteen layers of a VGG16 module), whose structure and parameters are directly migrated from Alexnet or VGG16 and only needs fine tuning during training; the second stack is formed by five convolution layers, first four of the five convolution layers proceed with a pooling layer, the last of the five convolution layers has a linear output; wherein an input of a first convolution layer of the five convolution layers is a normalized RGB image, and an input of a second convolution layer of the five convolution layers is a feature formed by concatenating an up-sampled output of the first stack to the pooled output of the first convolution layer of the five convolution layers; then the input of a next convolution layers is the output of a previous convolution layer;

a loss function used in the first stage during training is:

$$L = \frac{1}{N}\sum_i d_i^2 - \frac{1}{2N^2}\left(\sum_i d_i\right)^2 + \frac{1}{N}\sum_i [(\nabla_x d_i)^2 + (\nabla_y d_i)^2] \quad (1)$$

during the second stage of training, the network parameters obtained in the first stage are fixed, only parameters of the third stack need to be adjusted; the third stack is formed by four convolution layers, first three of the four convolution layers proceed with a pooling, the last of the four convolution layers has a linear output; wherein the input of the first convolution layer of the four convolution layers is the normalized RGB image, and the input of a second convolution layer of the four convolution layers is a feature formed by concatenating an up-sampled output of the second stack to the pooled output of the first convolution layer of the four convolution layers; then the input of a next convolution layers is the output of a previous convolution layer.

The present invention fine-tunes the DCNN (Alexnet or VGG16) pretrained by the Imagenet data set, and uses convolution layers and first two fully-connected layers of the Alexnet or VGG16 as a dense feature extractor, then adds more convolution layers to make the network deeper and stronger, and finally forms a multi-scale DCNN to predict a dense depth map of the given image; the structure of the multi-scale DCNN is shown in FIG. 1.

Referring to FIG. 1, the Imagenet pre-trained network adopts the first seven layers of the Alexnet module or the first fifteen layers of the VGG16 module which are trained by the Imagenet. When a size of the input image is not identical to a size of an Imagenet training image, then only parameters of the first five layers of the Alexnet module or the first thirteen layers of the VGG16 module are retained, parameters of the last two full-connecting layers have to be retrained.

The training process of the whole network is carried out in two stages, as shown in dotted boxes in FIG. 1. The network trained in the first stage comprises two network stacks, and the normalized image firstly passes through the first network stack, namely the Imagenet pre-trained network, wherein the output scale of the first stack will be much smaller than the original input image. In order to improve a resolution of the output depth map and retain more local detail information, the output of the first training stack is firstly processed with up-sampling by 4 times of height and width, then the result thereof is compared with the result of the normalized input image after a convolution and pooling (the size of a convolutional kernel and a pooling stride are selected so that the output scale is the same as the upsampled output size of the previous stack) for channel concatenating, the concatenated feature is inputted into the subsequent four convolution layers with small strides and zero-padding, so that the size of the feature remains the same during the four layers. In the four convolution layers, ReLUs (Rectified linear unit) followed the first three convolution layers, and the last convolution layer has linear output, which is the predicted depth map whose height and width are about ¼ of those of the input image.

In order to adjust the network parameters by back propagating the loss during the training process, the present invention scales the target depth map to the same size as the output, and converts it to the logarithmic space, and then calculate the loss according to the function 1. During the first stage of training, only the network parameters inside the upper dotted box in the FIG. 1 is adjusted, wherein learning rates for each layer are set to: 0.001 for the Imagenet pre-trained network convolution layer, 0.1 for the two fully-connected layers, 0.001 for the first and the last convolution layers of the second stack, and 0.01 for the median three convolution layers.

The size of the output depth map trained by the first stage is relatively small, which is only ¼ of height and width of the input image, wherein contour is blurred and details are lost. Therefore, the present invention uses the network trained by the second stage to further refine the features and obtain a more delicate depth map output by utilizing high-resolution details of the input image. In order to obtain a larger depth map output, the present invention firstly up-samples the network output of the first stage by 2 times in height and width, and concatenating it with the normalized input image through a layer of convolution and pooling, which is input to three convolution layers in sequence, wherein the size of the output are the same as the size of the up-sampled output of the first stage, which is ½ of the height and width of the original input image.

The network parameters trained in the first stage are fixed while the network parameters of the second stage are trained. Learning rates for each layer of the second stage are set to: 0.001 for the first and the last convolution layers, 0.01 for the median convolution layers, and 0.1 for a CRF layer.

DCNN can predict a rough depth map of a scene in a given image, but cannot accurately draw contours of each object in the scene, because high-level features after multiple pooling layers have strong invariance and large receptive field size, which is conducive to classification, but brings challenges for inferring localization details with those high-level features. Although the above processes have made full use of a multi-scale structure to refine the local information, the final predicted result is still blurring in contours. In order to recover clear edges in the predicted depth map, the present invention integrates the sparse connected CRF into a multi-scale depth learning CNN framework.

(3) optimizing prediction with a CRF

If I represents the input image, and $Y=(y_1, \ldots, y_n) \in R^n$ corresponds to depth values of all pixels in I, then for a given I, a conditional probability distribution function can be established for Y with the following density functions:

$$P(Y|I) = \frac{1}{Z(I)} \exp(-E(Y, I)) \qquad (2)$$

wherein E(Y,I) is an energy function, and a distribution function Z is defined as:

$$Z(I) = \int_Y \exp(-E(Y,I)) dY \qquad (3)$$

Depth prediction of the input image I is able to be obtained through calculating the following maximum a posteriori estimation:

$$\tilde{Y} = \underset{Y}{\operatorname{argmax}} P(Y|I) \qquad (4)$$

The energy function E(Y,I) can be defined as a combination of unary potential energy and pairwise potential energy, wherein the unary potential energy is defined as Euclidean distance between natural logarithms of a depth map which is the output of the third stack of the DCNN after up-sampling and boundary completion with bilinear interpolation and the ground truth depth values. According to similarities of position and color features between different pixels in the input image, the pairwise potential energy of the energy function is calculated as follows:

$$E(Y,I) = \Sigma_i u(y_i, I) + \Sigma_{ij} \theta_{ij}(y_i, y_j, I) \qquad (5)$$

wherein u is a unary potential energy term obtained by calculating minimum mean square loss of a CNN output:

$$u(y_i, I) = (z_i - y_i)^2 \qquad (6)$$

wherein $z_i$ and $y_i$ are a predicted logarithmic depth value and the true logarithmic depth value of a No. i effective pixel respectively.

The pairwise energy potential energy is defined as:

$$\theta_{ij}(y_i, y_j, I) = (y_i - y_j)^2 \Sigma_{m=1}^K w_m k_m(f_i, f_j) \qquad (7)$$

Figure 2:
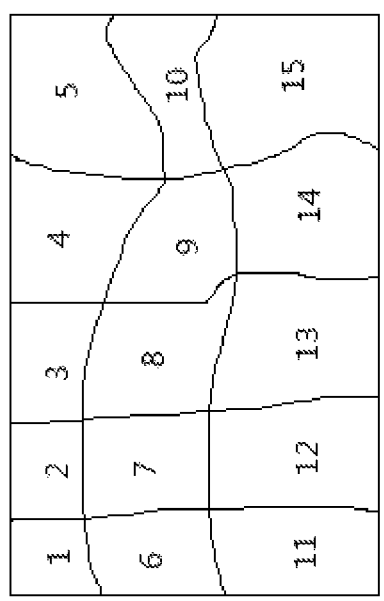
FIG. 2 is a sketch view of super-pixels and their neighboring super-pixels.

Referring to FIG. 1, in addition to the DCNN preliminary predicted depth map, a similarity matrix (i.e., the pairwise potential energy) of the pixels are also inputted into a CRF module, wherein the pairwise potential energy is sparsely distributed, considering relationships only between pixels that are in a neighborhood. In order to determine whether two pixels are in the neighborhoods of each other, the present invention firstly divides the input image into 500 super-pixels using an SLIC algorithm and defining pixels in the same super-pixel or in adjacent super-pixels as neighborhood pixels, thereby determining the neighborhood and the similarity matrix between the pixels. Referring to FIG. 2, if regions 1-15 represent 15 super-pixels, then for pixels in the eighth super-pixel, all pixels in the second, third, fourth, seventh, eighth, ninth, twelfth, thirteenth and fourteenth super-pixels are neighborhood pixels.

In the function 7, each $k_m$ is a Gaussian kernel depending on a feature $f_i$ of a No. i pixel and a feature $f_j$ of a No. j pixel, which is weighted by $w_m$. The pixels in the same super-pixel share the same set of Gaussian kernel parameters, and the pixels in adjacent super-pixels share another set of Gaussian kernel parameters. According to the present invention, features of the pixels are determined by positions and colors, so a weighted Gaussian kernel is defined as:

$$w_1 \exp\left(-\frac{\|p_i - p_j\|^2}{2\sigma_1^2} - \frac{\|c_i - c_j\|^2}{2\sigma_2^2}\right) + w_2 \exp\left(-\frac{\|p_i - p_j\|^2}{2\sigma_3^2}\right) \qquad (8)$$

wherein $p_i$ and $p_j$ are vertical and horizontal coordinates of the No. i pixel and the No. j pixel respectively, $c_i$ and $c_j$ are LAB color values of the No. i pixel and the No. j pixel respectively; values of w and σ depend on relative positions of the No. i pixel and the No. j pixel, wherein if two pixels are in the same super-pixel, then w and σ have larger values; if two pixels are in two different but adjacent super-pixels, then w and σ have smaller values; if two pixels are in two nonadjacent super-pixels, then two weights are both 0.

The first term in the function 8 depends on both positions and colors, which means that if two pixels are more similar in position and color, the term is larger, and vice versa; the second term only depends on position. During similarity calculation, the original image is converted from an RGB color space to a Lab color space, wherein the pairwise potential energy based on relationship between the pixels is summarized as follows:

if two pixels are in the same super-pixel:

$$\theta_{ij}(y_i, y_j, I) = \qquad (9)$$
$$(y_i - y_j)^2 \left[ w_1 \exp\left(-\frac{\|p_i - p_j\|^2}{2\sigma_1^2} - \frac{\|c_i - c_j\|^2}{2\sigma_2^2}\right) + w_2 \exp\left(-\frac{\|p_i - p_j\|^2}{2\sigma_3^2}\right) \right]$$

if two pixels are in two adjacent super-pixels:

$$\theta_{ij}(y_i, y_j, I) = (y_i - y_j)^2 \qquad (10)$$
$$\left[ w_3 \exp\left(-\frac{\|p_i - p_j\|^2}{2\sigma_4^2} - \frac{\|c_i - c_j\|^2}{2\sigma_5^2}\right) + w_4 \exp\left(-\frac{\|p_i - p_j\|^2}{2\sigma_6^2}\right) \right]$$

other conditions:

$$\theta_{ij}(y_i, y_j, I) = 0 \qquad (11)$$

It can be concluded from functions 9 and 10 that the two functions are in the same form except for parameters. Considering that closer pixels are more related, values of $w_1$, $w_2$, $\sigma_1$, $\sigma_2$ and $\sigma_3$ will be larger than values of $w_3$, $w_4$, $\sigma_4$, $\sigma_5$ and $\sigma_6$. The parameters w and σ should be optimized for obtaining an ideal result. There are two optimization methods: integrating the CRF into the DCNN, and optimizing with an SGD method, wherein loss is calculated by comparing a CRF output with the ground-truth logarithmic depth map; or independently optimizing a CRF module by using cross validation, wherein optimized parameters are searched by cycling from large step sizes to small step sizes in a certain range, this time the DCNN parameters are constant.

A CRF layer can be integrated into the DCNN for obtaining optimized values of the parameters $w_1, \ldots, w_4$ and $\sigma_1, \ldots, \sigma_6$ through training. However, the DCNN may be trained firstly, which includes parameters from the first layer to the last convolution layer, and the output of the last convolution layer is the predicted depth. The function 1 is still used to calculate the loss for back propagation, so as to adjust the network parameters of the four convolution layers. Surely, the size of the target depth map here is twice the height and width of the target depth map of the first stage; while the CRF is regarded as an independent post-processing step, CRF parameters can be cross-validated by a small verification data set.

The present invention uses a negative log-likelihood function as a loss function of the model:

$$L(W) = -\log[P(Y|I)] = -\log\left[\frac{1}{Z(i)}\exp(-E(Y, I))\right] \quad (12)$$

for minimizing the loss function 12, namely maximizing $P(Y|I)$, it is known after a series of derivation that:

$$\begin{aligned}\tilde{Y} &= \underset{Y}{\operatorname{argmax}} P(Y \mid I) \\ &= \underset{Y}{\operatorname{argmax}} -Y^T A Y + 2Z^T Y \\ &= A^{-1} Z\end{aligned} \quad (13)$$

wherein Z is a depth value after up-sampling and boundary completion the output of the third stack of the DCNN with bilinear interpolation, A is determined by the following matrix:

$$A = E + D - S \quad (14)$$

wherein S is a similarity matrix determined by $s_{ij} = \sum_{m=1}^{K} w_m k_m(f_i, f_j)$, D is a diagonal matrix with diagonal elements $d_{ii} = \sum_j s_{ij}$, E is an N×N unit matrix. In the function $\tilde{Y}$ is a final depth map with recovered edge details. After parameter optimization of the DCNN and the CRF is completed, high accuracy and detail reserved the depth map can be obtained by inputting the RGB image to a system formed by the DCNN and the CRF, and transforming the output depth image from the logarithmic space back into the linear space.

Referring to FIG. 1, when entering the second stage of CNN training, the network parameters of the first stage are fixed, and the network parameters of the second stage are trained independently; wherein the CRF layer can be integrated into the CNN for joint training; or the CNN parameter is trained first, the CRF is used as post-processing, and the CRF parameters are determined by cross validation.

In addition, network parameters of outdoor scenes and indoor scenes are not compatible, so an indoor data set and an outdoor data set should be used to train two different systems, so as to provide depth estimation for indoor scenes and outdoor scenes respectively. Four different specific embodiments are as follows:

Embodiment 1

1. using original data of 249 scenes in 464 indoor scenes of NYU Depth v2 data set as training samples, down-sampling an RGB image thereof from 640×480 to 320×240; then cropping a 304×228 area by random translation as the final output image; extracting 1200 different image samples from each scene, and expending to about 2000000 image samples by data enhancement such as translating, rotating, scaling, luminance shifting, and flipping;
2. executing the first stage training, wherein a first stack adopts an Imagenet pre-trained Alexnet;
3. fixing network parameters obtained in the first stage, and proceeding the second stage of training, which comprises parameter optimization of a second half of DCNN and a CRF;
4. since network output results are natural logarithm depths, recovering depth data by transformation from natural logarithms space to linear space; and
5. using the network to estimate depth of any indoor scene, wherein the size of the input image should be adjusted to 304×228 before estimating.

Embodiment 2

1. using original data of 249 scenes in 464 indoor scenes of NYU Depth v2 data set as training samples, down-sampling a RGB image thereof from 640×480 to 320×240; then cropping a 304×228 area by random translation as the final output image; extracting 1200 different image samples from each scene, and expending to about 2000000 image samples by data enhancement such as translating, rotating, scaling, luminance shifting, and flipping;
2. executing the first stage training, wherein a first stack adopts network structure and parameters of an Imagenet pre-trained VGG16;
3. fixing network parameters obtained in the first stage, and providing a second stage of training, which comprises parameter optimization of a second half of DCNN and a CRF;
4. since network output results are natural logarithm depths, recovering depth data by transformation from natural logarithms space to linear space; and
5. using the network to estimate depth of any indoor scene, wherein a size of the input image should be adjusted to 304×228 before estimating.

Embodiment 3

1. using original data of 249 scenes in 464 indoor scenes of NYU Depth v2 data set as training samples, down-sampling an RGB image thereof from 640×480 to 320×240; then cropping a 304×228 area by random translation as the final output image; extracting 1200 different image samples from each scene, and expending to about 2000000 image samples by data enhancement such as translating, rotating, scaling, luminance shifting, and flipping;
2. executing the first stage training, wherein a first stack adopts an Imagenet pre-trained Alexnet;
3. fixing network parameters obtained in the first stage, and executing a second stage of training, wherein only a second half of DCNN to the last convolution layer, namely the second dotted box in FIG. 1, is trained;
4. randomly choosing one sample in each scene of the training set as a data set for cross validation of CRF parameters, and using an output of the previously trained DCNN and inter-pixel sparse similarity matrix data calculated according to the input image for optimizing the CRF parameters; and 5. forming a system as shown in FIG. 1 by the trained DCNN and an optimized CRF for treating any indoor scene inputted into the system, wherein a size of the input image should be adjusted to 304×228 before estimating.

Embodiment 4

1. using original data of 249 scenes in 464 indoor scenes of NYU Depth v2 data set as training samples, downsampling an RGB image thereof from 640×480 to 320×240; then cropping a 304×228 area by random translation as the final output image; extracting 1200 different image samples from each scene, and expanding to about 2000000 image samples by data enhancement such as translating, rotating, scaling, luminance shifting, and flipping;

2. executing a first stage of training, wherein a first stack adopts network structure and parameters of an Imagenet pre-trained VGG16;

3. fixing network parameters obtained in the first stage, and executing a second stage of training, wherein only a second half of DCNN, namely the second dotted box in FIG. 1, is trained until the last convolution layer;

4. randomly choosing one sample in each scene of the training set as a data set for cross validation of CRF parameters, and using an output of the previously trained DCNN and inter-pixel sparse similarity matrix data calculated according to the input image for optimizing the CRF parameters; and 5. forming a system as shown in FIG. 1 by the trained DCNN and an optimized CRF for treating any indoor scene inputted into the system, wherein a size of the input image should be adjusted to 304×228 before estimating.

One skilled in the art will understand that the embodiment of the present invention as shown in the drawings and described above is exemplary only and not intended to be limiting. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A depth estimation method for a monocular image based on a multi-scale CNN (convolution neural network) and a continuous CRF (conditional random field), comprising steps of:
   (1) obtaining a preset amount of sample images with a camera, and processing the sample images with data enhancement and normalization in sequence with a computer;
   (2) training a DCNN (deep convolution neural network) with normalized sample images by two stages with the computer, wherein the DCNN comprises a first stack, a second stack and a third stack; the first stack and the second stack are trained by a first stage, and the third stack is trained by a second stage;
   (3) for an input image I whose depth is to be estimated, establishing a conditional probability distribution function P(Y|I) related to the input image I and a depth map Y thereof according to a DCNN output:

$$P(Y|I) = \frac{1}{Z(I)}\exp(-E(Y, I))$$

$$Z(I) = \int_Y \exp(-E(Y, I))dY$$

$$E(Y, I) = \sum_i (z_i - y_i)^2 + \sum_{ij} (y_i - y_j)^2$$

$$\left[ w_{ij1}\exp\left(-\frac{\|p_i - p_j\|^2}{2\sigma_{ij1}^2} - \frac{\|c_i - c_j\|^2}{2\sigma_{ij2}^2}\right) + w_{ij2}\exp\left(-\frac{\|p_i - p_j\|^2}{2\sigma_{ij3}^2}\right) \right]$$

wherein Z(I) is a partition function corresponding to the input image I, E(Y,I) is an energy function related to the input image I and the depth map Y thereof, $z_i$ is a predicted logarithmic depth value of a No. i effective pixel, $y_i$ and $y_j$ are true logarithmic depth values of the No. i effective pixel and a No. j effective pixel respectively, $p_i$ and $p_j$ are coordinate values of the No. i effective pixel and the No. j effective pixel respectively, $c_i$ and $c_j$ are LAB color values of the No. i effective pixel and the No. j effective pixel respectively; $w_{ij1}$, $w_{ij2}$, $\sigma_{ij1}$, $\sigma_{ij2}$ and $\sigma_{ij3}$ are all CRF model parameters; i and j are both natural numbers and 1≤i≤N, 1≤j≤N, N is a total effective pixel number;

then finding a solution to maximize P(Y|I), and converting a calculated depth map $\hat{Y}$ from a logarithmic space into a linear space, so as to obtain a depth map with a high accuracy and with object contour detail reserved; and (3) forming a three-dimensional model of the input image I using the depth map, and projecting the three-dimensional model of the input image I to obtain an image from another visual angle of the input image I, or calculating the image from another visual angle directly with the depth map according to a binocular disparity principle.

2. The depth estimation method, as recited in claim 1, wherein the data enhancement comprises scaling, rotating, translating, luminance shifting, and flipping; the normalization comprises subtracting a mean image of the sample images and dividing by a mean square error.

3. The depth estimation method, as recited in claim 1, wherein the first stack of the DCNN is an Imagenet pre-trained network, which adopts first seven layers of an Alexnet module or first fifteen layers of a VGG16 module; the second stack is formed by five convolution layers, first four of the five convolution layers are proceeded with pooling, a last of the five convolution layers has a linear output; wherein an input of a first convolution layer of the five convolution layers is the normalized sample images obtained in the step (1), and an input of a second convolution layer of the five convolution layers is a feature formed by concatenating an up-sampled output of the first stack with a pooling output of the first convolution layer of the five convolution layers; all inputs of a later convolution layers is an output of a previous convolution layer thereof; the third stack is formed by four convolution layers, first three thereof are proceeded with pooling, a last of the four convolution layers has a linear output; wherein the input of a first convolution layer of the four convolution layers is the normalized sample images obtained in the step (1), and an input of a second convolution layer of the four convolution layers is a feature formed by concatenating an up-sampled output of the second stack with a pooling output of the first convolution layer of the four convolution layers; all inputs of a later convolution layer is an output of a previous convolution layer thereof.

4. The depth estimation method, as recited in claim 3, wherein a loss function L used in the first stage during training is:

$$L = \frac{1}{N}\sum_i d_i^2 - \frac{1}{2N^2}\left(\sum_i d_i\right)^2 + \frac{1}{N}\sum_i [(\nabla_x d_i)^2 + (\nabla_y d_i)^2]$$

wherein $d_i = \lg x_i - \lg x_i^*$, $x_i$ and $x_i^*$ are a predicted depth value and a ground truth of the No. i effective pixel respectively, $\nabla_x d_i$ and $\nabla_y d_i$ are a horizontal gradient and a vertical gradient of $d_i$ respectively.

5. The depth estimation method, as recited in claim 1, wherein in the step (3), the solution to maximize P(Y|I) is achieved by:

$$\tilde{Y} = \underset{Y}{\mathrm{argmax}} P(Y \mid I) = A^{-1} Z$$
$$A = E + D - S$$

wherein Z is a depth value after up-sampling and boundary completion an output of the third stack of the DCNN with bilinear interpolation, D is a diagonal matrix with diagonal elements $d_{ii} = \Sigma_j s_{ij}$, is a similarity matrix whose element at a row i and a column j is $$s_{ij} = \sum_{ij} (y_i - y_j)^2$$
$$\left[ w_{ij1} \exp\left(-\frac{\|p_i - p_j\|^2}{2\sigma_{ij1}^2} - \frac{\|c_i - c_j\|^2}{2\sigma_{ij2}^2}\right) + w_{ij2} \exp\left(-\frac{\|p_i - p_j\|^2}{2\sigma_{ij3}^2}\right) \right],$$

E is an N×N unit matrix.

6. The depth estimation method, as recited in claim 1, wherein the CRF model parameters $w_{ij1}$, $w_{ij2}$, $\sigma_{ij1}$, $\sigma_{ij2}$ and $\sigma_{ij3}$ are obtained by: integrating the CRF into the DCNN, and optimizing with an SGD method, wherein loss is calculated by comparing a CRF output with a ground truth logarithmic depth map; or independently optimizing a CRF module by using cross validation, wherein optimized parameters are searched by cycling from large step sizes to small step sizes in a certain range this time the DCNN parameters are fixed.

* * * * *